United States Patent [19]

Fuderer

[11] Patent Number: 4,723,966
[45] Date of Patent: Feb. 9, 1988

[54] GAS SEPARATION BY PRESSURE SWING ADSORPTION

[75] Inventor: Andrija Fuderer, Antwerp, Belgium

[73] Assignee: Union Carbide Corporation, Danbury, Conn.

[21] Appl. No.: 940,612

[22] Filed: Dec. 11, 1986

[51] Int. Cl.$^4$ .............................................. B01D 53/04
[52] U.S. Cl. ........................................... 55/26; 55/58; 55/62; 55/68; 55/75
[58] Field of Search .................... 55/25, 26, 58, 59, 62, 55/68, 74, 75

[56] References Cited

U.S. PATENT DOCUMENTS

| | | | |
|---|---|---|---|
| 2,944,627 | 7/1960 | Skarstrom | 55/62 X |
| 2,978,407 | 4/1961 | Tuttle et al. | 55/62 X |
| 3,176,444 | 4/1965 | Kiyonaga | 55/26 |
| 3,430,418 | 3/1969 | Wagner | 55/25 |
| 3,680,288 | 8/1972 | Eluard | 55/62 X |
| 3,738,087 | 6/1973 | McCombs | 55/58 |
| 3,986,849 | 10/1976 | Fuderer et al. | 55/25 |
| 4,011,065 | 3/1977 | Münzner et al. | 55/25 |
| 4,093,429 | 6/1978 | Siegler et al. | 55/62 X |
| 4,264,338 | 4/1981 | Null | 55/16 |
| 4,354,859 | 10/1982 | Keller, II et al. | 55/25 |
| 4,398,926 | 8/1983 | Doshi | 55/25 X |
| 4,512,780 | 4/1985 | Fuderer | 55/26 |
| 4,578,089 | 3/1986 | Richter et al. | 55/62 X |
| 4,589,888 | 5/1986 | Hiscock et al. | 55/26 |

FOREIGN PATENT DOCUMENTS 1306111 12/1965 France ........................ 55/26
1536995 12/1978 United Kingdom .

Primary Examiner—Robert Spitzer
Attorney, Agent, or Firm—Morris N. Reinisch

[57] ABSTRACT

A pressure swing adsorption process is disclosed wherein binary gas purification is effected from a single adsorbent bed. An adsorbent bed is charged under pressure with a gas mixture having some components that are more adsorbable than others. The process causes the bed to be polarized with one end of the bed containing the more adsorbable components and the other end containing the less adsorbable components. Once charged, the bed is depressurized simultaneously from both ends, thus removing the separated components from their respective ends.

36 Claims, 7 Drawing Figures

GAS SEPARATION BY PRESSURE SWING ADSORPTION

BACKGROUND OF THE INVENTION

1. Field of the Invention

The invention relates to a process for the separation of gas mixtures by passing them over an adsorbent bed which absorbs a first component of the gas mixture in preference to a second component of the gas mixture. More particularly, the invention relates to separation of gas mixtures by pressure swing adsorption (PSA) wherein a gas richer than the feed gas in the stronger adsorbed components is utilized to displace the less adsorbable components from the feed end of the bed, whereupon the bed is depressurized by simultaneously taking out gas on at least two different points of the bed.

2. Description of the Prior Art.

First applications of PSA processes were performed to achieve the objective of removing smaller quantities of adsorbable components from essentially non-adsorbable gases. Examples of such processes are the removal of water from air, also called heatless drying, or the removal of smaller quantities of impurities from hydrogen. Later this technology was extended to bulk separations such as the recovery of pure hydrogen from a stream containing 30 to 90 mol percent of hydrogen and other readily adsorbable components like carbon monoxide or dioxide, or, for example, the recovery of oxygen from air by selectively adsorbing nitrogen onto molecular sieves.

The carrying out of the PSA process in multi-bed systems is illustrated by the Wagner patent, U.S. Pat. No. 3,430,418, relating to a system having at least four beds. As is generally known and described in this patent, the PSA process is commonly performed in a cycle of a processing sequence that includes in each bed: (1) higher pressure adsorption with release of product effluent from the product end of the bed; (2) cocurrent depressurization to intermediate pressure with release of void space gas from the product end thereof; (3) countercurrent depressurization to a lower desorption pressure; (4) purge; and (5) repressurization. The void space gas released during the cocurrent depressurization step is commonly employed for pressure equalization purposes and to provide purge gas to a bed at its lower desorption pressure.

Similar systems are known which utilize 3 beds for separations. See, for example, U.S. Pat. No. 3,738,087 to McCombs. The faster the beds perform steps 1 to 5 to complete a cycle, the smaller the beds can be when used to handle a given hourly feed gas flow. If two steps are performed simultaneously, the number of beds can be reduced or the speed of cycling increased; thus, reduced costs are obtainable.

U.S. Pat. No. 4,589,888 to Hiscock et al. discloses that reduced cycle times are achieved by an advantageous combination of specific simultaneous processing steps. The gas released upon cocurrent depressurization from higher adsorption pressure is employed simultaneously for pressure equalization and purge purposes. Cocurrent depressurization is also performed at an intermediate pressure level, while countercurrent depressurization is simultaneously performed at the opposite end of the bed being depressurized.

U. S. Pat. No. 4,512,780 to Fuderer discloses a pressure swing adsorption process with intermediate product recovery. Three products are recovered from a pressure swing adsorption process utilizing a displacement step in conjunction with pressure equalization between beds of a multi-bed adsorption system. This process is not cost efficient for the recovery of two products.

PSA processes were first used for gas separations in which only one of the key components was recovered at high purity. For example, from 100 moles feed gas containing 80 moles hydrogen and 20 moles carbon monoxide, the process of the Wagner, U.S. Pat. No. 3,430,418, or of the Hiscock et al., U.S. Pat. No. 4,589,888, could separate 60 moles of hydrogen at 99.999% purity, but no pure carbon monoxide could be recovered; 20 moles of carbon monoxide and 20 moles of hydrogen remained mixed at 50% purity each. Neither of these processes can make a complete separation. Only the less adsorbable, light component is recovered at high purity.

For the recovery of a pure, stronger adsorbed, "heavy" component, an additional step is necessary, namely, rinsing of the bed with a heavy component to displace the light component from the bed prior to depressurization. The rinsing step is described in several earlier patents. The problems with these processes are the following: (a) if the rinsing is complete and the light component is completely displaced from the bed, pure heavy component can be obtained, but the adsorption front of the heavy component breaks through to the light component and the latter cannot be recovered at high purity; (b) if the displacement of the light component is incomplete, the typical concentration profile of the heavy component in the bed as indicated on FIG. 2 is obtained, and if such bed is depressurized countercurrently to recover the heavy key component at the feed end, the light component still present in the bed reaches the feed end very rapidly and the purity of the heavy component drops. Therefore it is not practical with the prior art processes to obtain both key components at high purity in a single PSA unit.

Such complete separations can be obtained, for example, by two separate pressure swing adsorption processing units wherein each unit includes several fixed beds. From a feed gas containing, for example, hydrogen and carbon monoxide (CO), the first unit recovers pure hydrogen and a carbon monoxide rich gas containing 70 percent carbon monoxide. This gas mixture is compressed and passed through a second PSA unit which recovers pure carbon monoxide and a hydrogen rich gas. The hydrogen rich gas can be added as feed gas to the first PSA unit and then the cycle is repeated. The combination of two independent PSA units can make an excellent separation at very high flexibility. For example, from a gas mixture with two components this system can recover more than 99.8 percent of the adsorbable "light" component such as hydrogen at a purity of 99.999 percent and also recover essentially 100 percent of the more readily adsorbed component such as carbon monoxide at a purity higher than 99.5 percent.

A PSA process suitable for the recovery of both the less and more readily adsorbable components is described in British Pat. No. 1,536,995 to Benkmann. The process is based on two beds in series cycle as shown in FIG. 2 of Benkmann. The feed is introduced to the lower bed which retains the more readily adsorbable component. The feed step is followed by a copurge step in which the less readily adsorbable or "light" component is displaced in the lower bed by a recycled stream of "heavy" components, so that the lower bed at the end of the step contains only the "heavy" component. At this moment, the connection between the upper and lower beds is interrupted by an automatic valve and the heavy product is recovered from the lower bed by (countercurrent) depressurization. The upper bed is, in the meantime, also depressurized and purged to remove all of the heavy component. The step sequence of the upper and lower bed are interlocked and cannot be run with independent cycles. The flexibility of this system is therefore reduced while the complexity is increased. Problems with this system are: a set of two beds in series is needed; if process conditions such as feed gas composition change, it is not possible to change the volume ratio of the two beds which means lower flexibility; the vessel heads of the two beds contain more void space gas which increases depressurization loss and compressor power; and the pressure drop is also increased.

There remains in the industry a need to further reduce the amount of capital equipment required for PSA and to boost the efficiency of this equipment. This invention satisfies this need by achieving a high quality gas separation with a simple, more economical and more flexible system. This simplicity and reduced expense is obtained because the invention achieves gas separation at a low compression power requirement. The low power requirement is achieved by the need for less displacement gas. There are known displacement cycles which provide products of high purity; however, the present invention provides such products at lower energy expense.

SUMMARY OF THE INVENTION

The invention is a fixed bed pressure swing adsorption process for the separation of a mixed feed gas stream into at least two product gas streams. The process comprises the following steps:

(A) feeding/adsorbing a feed gas onto an adsorption bed to selectively adsorb a stronger adsorbed component;

(B) rinsing the bed by displacing the feed gas present therein with a gas having a higher concentration of the stronger adsorbed components;

(C) depressurizing the bed by taking out gas from at least two different points of the bed; and (D) repressurizing the bed. Preferred embodiments also comprise a cocurrent depressurization and a purge step. The cocurrent depressurization may be carried out before, simultaneously or after the rinsing step.

DESCRIPTION OF THE PREFERRED EMBODIMENTS

The invention comprises a method for gas purification or separation by a pressure swing adsorption process wherein binary separations are achieved with single adsorption beds. The steps of the method include adsorption of a gas mixture having at least two components upon an adsorption bed. The bed has an input or feed end and an output or product end. Of the two components, one is more adsorbable than the other.

Adsorption is allowed to proceed under pressure until a mass transfer front is ideally located within the bed. The mass transfer front is a zone between a charged and uncharged adsorbent. Typical adsorbable components are carbon dioxide, methane, or carbon monoxide. Typical lesser adsorbable components are nitrogen or hydrogen. The adsorption step desirably proceeds until the mass transfer front is at least about halfway through the bed.

Once the adsorption step has proceeded to charge the bed sufficiently, the gas mixture is displaced or substituted with a gas having a higher concentration of the more adsorbable component. This step displaces lesser adsorbable components located at the feed end of the bed, to the product end of the bed. The displacement step is crucial for high purity yields because it substantially removes the less adsorbable components from the bed. Moreover, the displacement step ensures that the charged area of the bed is substantially loaded with only the more adsorbable components and the uncharged area of the bed contains the lesser adsorbable components.

Figure 3:
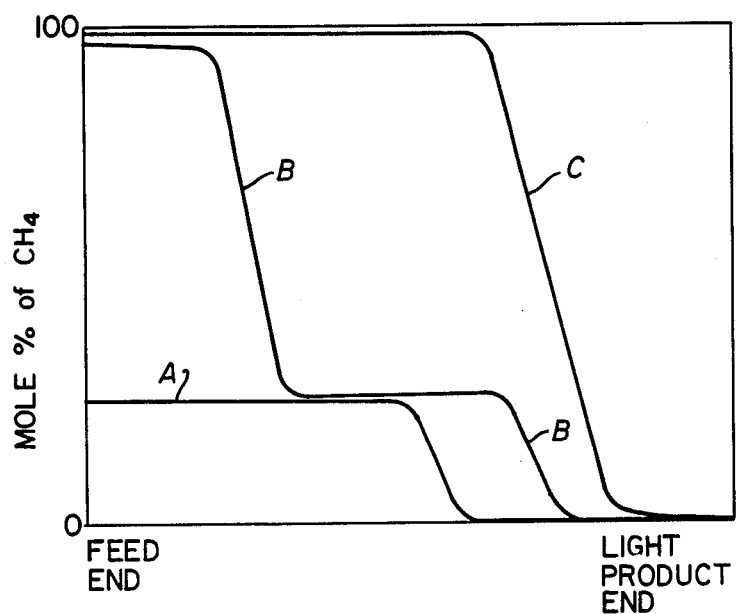
FIGS. 3 and 4 illustrate conditions in an adsorbent bed upon completion of steps A), B) and C).

During the following cocurrent depressurization step, the adsorption front is further advanced towards the light product end and more light component is displaced from the bed. FIG. 3 illustrates the gas compositions inside the bed for the binary gas mixture of Helium /light/ and methane /heavy component/. Curves A, B and C show the composition profile at the completion of the adsorption, displacement and cocurrent depressurization steps respectively. In each of the steps A, B and C the methane front progresses towards the light product end and more Helium is displaced from the bed and recovered at the light product end. FIG. 3 thus illustrates a case in which the displacement step precedes the cocurrent depressurization step.

Figure 4:
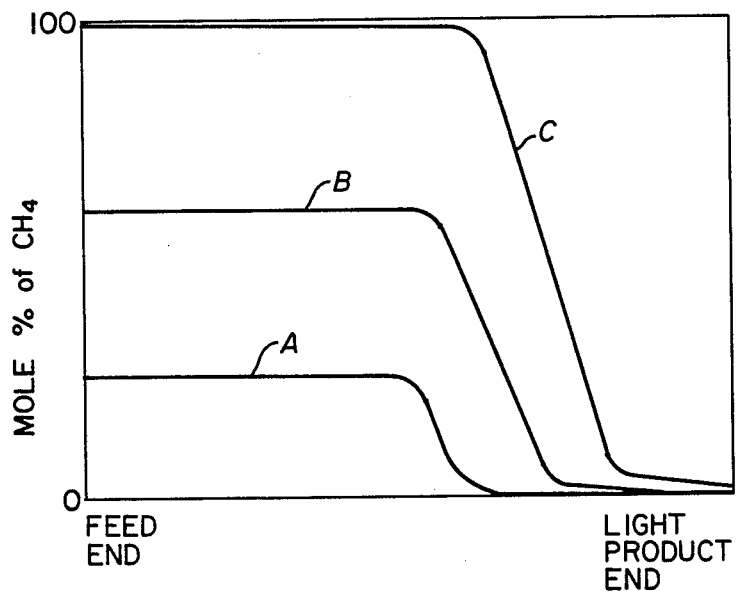

In FIG. 4, the curves A, B and C show methane concentration in mole % at the completion of adsorption, cocurrent depressurization and displacement steps. The cocurrent depressurization effluent gas is generally used for repressurizing other beds. The cocurrent depressurization step is specially advantageous if the feed gas adsorption pressure is high, because such depressurization substantially reduces the required amount of displacement gas. At moderate and lower feed gas pressures, fairly efficient cycles are possible without a separate cocurrent depressurization step. The relative amounts of feed gas, displacement gas, final pressure of the cocurrent depressurization step and bed size are selected in such a way that upon completion of step C, the front of the heavy key component is kept inside of the bed and the light product end contains essentially pure light component.

Referring to FIGS. 3 and 4, the step sequences are:

in FIG. 3, Adsorption→Displacement→Depressuring;

In FIG. 4, Adsorption→Depressurizing→Displacement.

Considering the cases of FIGS. 3 and 4, the same amount of feed gas and displacement gas is passed to the bed. Furthermore, the initial feed pressure and the final pressure are the same. The advantage of the sequence of FIG. 3 is that more light component is obtained at the highest pressure and the final concentration profile is slightly steeper. The advantage of the sequence of FIG. 4 is that the displacement gas is required at lower pressures. Moreover, it is also possible to carry out steps B and C simultaneously to save time. In either case, upon completion of step C, the feed end of the bed contains substantially pure stronger adsorbable components and the product end of the bed contains the lesser adsorable "light" components.

According to the invention, the adsorption bed is then depressurized by taking out gas simultaneously from at least two different points of the bed, thereby recovering adsorbable components from a side takeout of the bed, or from the feed end of the bed or from both of these points. Substantially pure lesser adsorbable components are recovered from the light product end of the bed. Such double ended or triple ended depressurizations can be carried out through fixed position but manually adjustable valves or control valves. For example, a fixed position valve located at the light product end and a reciprocating compressor at the other takeout point can be utilized. With proper control or adjustment of valve position, a zero flow plane can be established in the bed in proximity of the mass transfer front/adsorption front/. When process conditions change, for example feed gas composition, it is easy to change the position of the zero flow plane by adjusting the valve opening or the suction rate of the compressor.

Figures 5A, 5B, 5C:
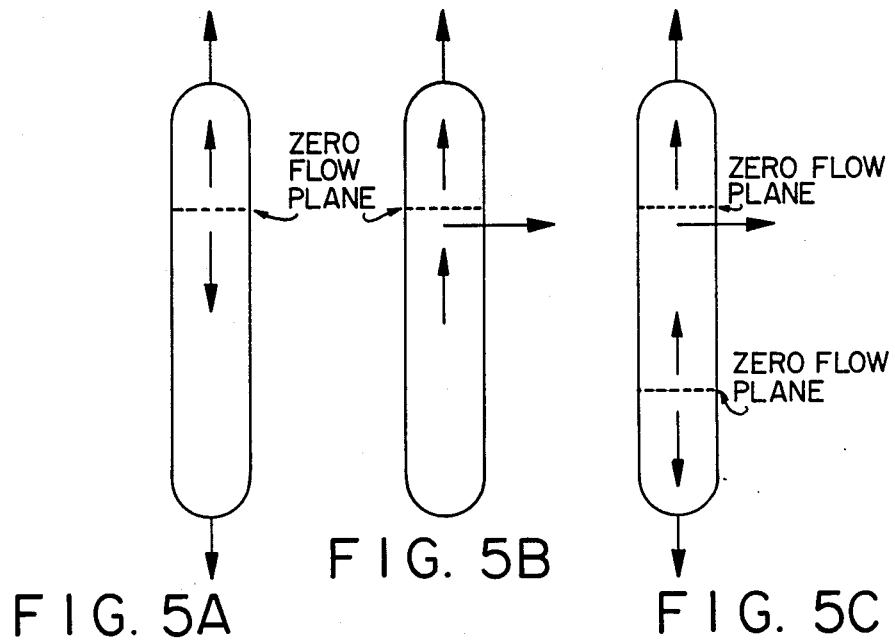
FIG. 5 illustrates cases of multi-ended depressurizations.

The term "Double Ended Depressurization" /DED/ is not limited to mean that the bed is depressurized cocurrently and countercurrently at the same time as shown in FIG. 5A. If a side take out is provided, a zero flow plane can be established also if the entire bed is depressurized cocurrently. This is illustrated on FIG. 5B. FIG. 5B shows that the portion of the bed above the side take-out is depressurized towards the light product end and the portion of bed below the side take-out is depressurized towards the side take-out. Both bed portions depressurize cocurrently and the pure heavy component is obtained at the side take-out. In the type of depressurization according to FIG. 5B, some gas may flow through the "zero flow plane" towards the light product end resulting in a "minimum flow plane". This may occur because of an improperly adjusted flowrate but it can also be done intentionally to ensure a more stable control and to ensure that no light key component can leak to the side take-out in case of a small upset in process conditions.

The term "cocurrent depressurization" used in the specification and the claims refers to a depressurization in which gas is taken from the bed at only one location. More precisely, gas is removed from the light product end.

It is also possible to simultaneously extract gas at three different points of the bed as shown by FIG. 5C. Thus, two zero flow planes are established inside the bed.

It must be stressed that without a previous rinsing of the bed, i.e., light component displacement from the feed end, the DED can not lead to a good separation of the two key components in and of itself. Only the combination of the displacement and DED steps brings about the desired result. Among other things, this represents a clear difference when comparing the previous art as represented by U.S. Pat. No. 4,589,888 to Hiscock et al., which could not achieve a full separation of the key components.

At the completion of the double-ended depressurization step, the bed can be purged from the product end with pure hydrogen and the purge effluent gas or simply, "pure effluent", can be used as fuel gas or compressed and added to the feed gas. Alternately, the bed can be repressurized without a purge step.

A portion of the more adsorbable gas recovered during the double-ended depressurization is conveniently recompressed and used in the displacement step.

The cycle is completed with the repressurization of the adsorption bed. It is also to be noted that conventional pressure swing adsorption apparatuses can be easily converted to enable the practice of this invention. For example, multiple adsorption beds set up in parallel can be used. Those skilled in the art are able to determine the optimum position of the mass transfer front for optimum gas separation without undue experimentation.

Figure 1:
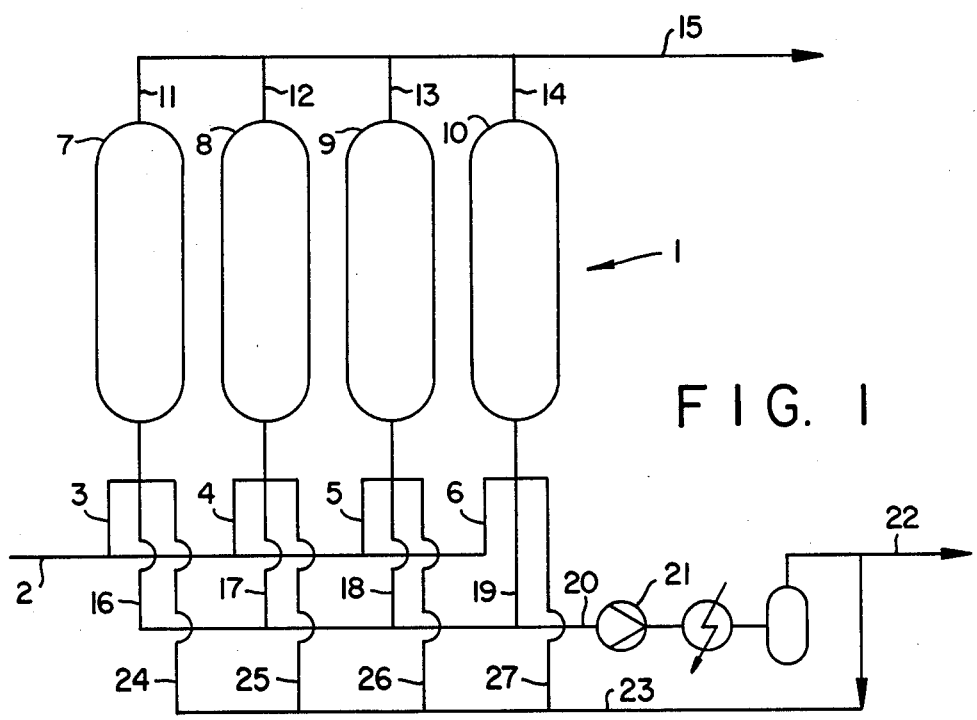
FIG. 1 is a diagramatic presentation of an apparatus for performing the invention.

Referring to FIG. 1, there is a single PSA system 1 shown. A set of four single adsorbent beds 7, 8, 9, and 10 are shown for this embodiment in parallel, but 5 to 12 single beds may be used in high efficiency cycles.

Figure 2:
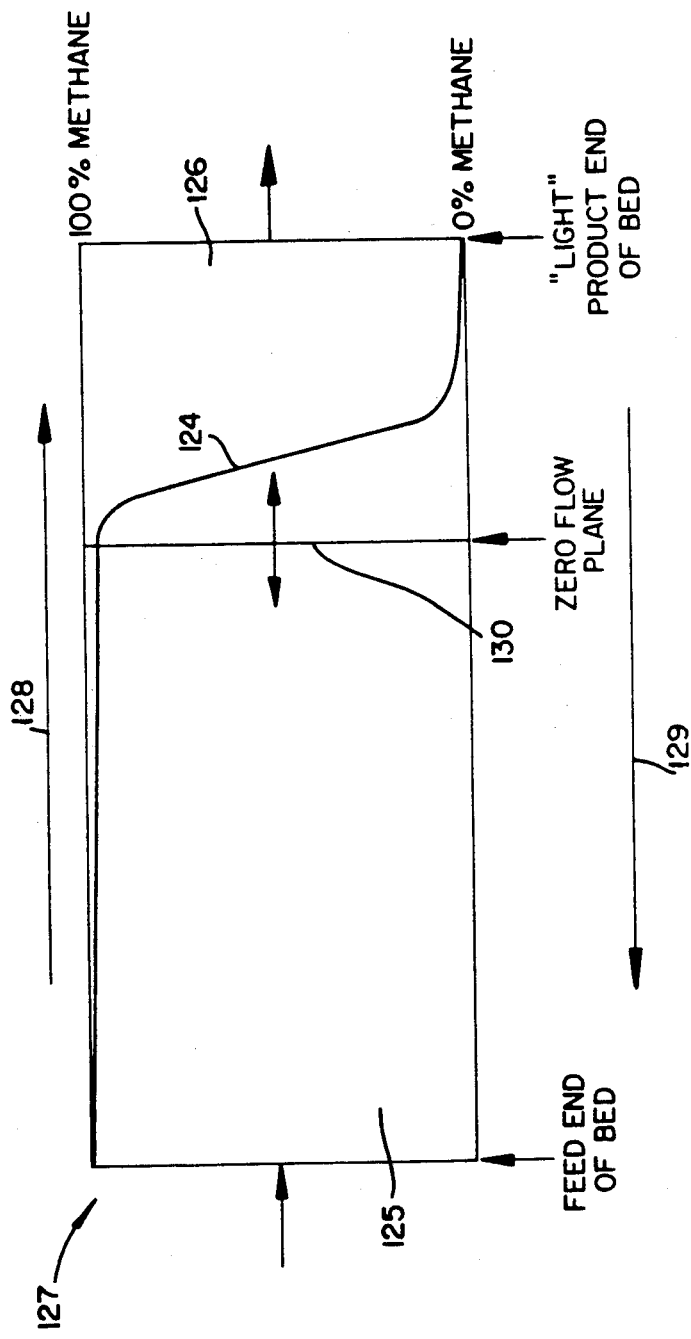
FIG. 2 is a graphical representation of the conditions in one of the adsorption beds of FIG. 1.

A feed gas comprising an adsorbable first component and a less adsorbable second component is flowed under pressure into the feed ends of the adsorbent beds 7, 8, 9, and 10 by way of a manifold line 2 and individual feed-end lines 3, 4, 5, and 6 until the concentration profile of FIG. 2 is established. The feed gas is then displaced by a gas from downstream through line 20. Preferably, the gas in line 20 is compressed to adsorption pressures in a compressor means 21 prior to being circulated through line 23 to individual displacement lines 24, 25, 26, and 27. Additionally, the compressed gas can be circulated to other adsorption assemblies by way of a line 22. The "heavy" gas product can be removed from the system as an end product at a point along lines 20, 22, or 23.

The downstream gas in line 23 has a high concentration of the first component such that flowing of the downstream gas into the feed-end of the adsorbent beds 7, 8, 9, and 10 causes any of the less adsorbable components remaining in the feed-end of the beds to move towards the product end of the beds. This displacement of the feed gas with the downstream gas is deemed "rinsing" or "copurging" and is necessary to achieve a substantially pure "heavy" product.

The following examples are illustrative of the invention and not restrictive, the scope of the invention being outlined in the claims.

EXAMPLE 1

A. 8 kgmoles of feed gas containing 70 mol % hydrogen, 5% CO, 1% Methane and 24% $CO_2$ is passed to an 8 m high adsorbent bed containing a layer of 6 m high activated carbon and a 2 m high layer of 13 X molecular sieves. The bed diameter is 1 m. The feed gas is at 35° C. and 2.2 MPa.

B. After completion of the above adsorption step A, 1.6 kgmoles of gas containing 98.5 mole % $CO_2$, 0.5% CO, 0.6% $CH_4$ and 0.4% hydrogen is passed to the feed end of the bed at 2.2 MPa. Both during step A and displacement step B, 99.999% pure hydrogen is exiting from the light product end, i.e., top, of the bed.

C. The adsorbent bed is then cocurrently depressurized in two steps from 2.2 MPa to 0.8 MPa, and the 99.996% hydrogen obtained at the top is utilized to repressurize other beds. At the end of this step, the bed contains practically no hydrogen up to a height of about 6 meters.

D. The bed is then depressurized to 0.12 MPa, i.e., 1.2 Bar, by extracting simultaneously 98.5% pure $CO_2$ at the feed end and 99.992% pure hydrogen at the top. This hydrogen stream is utilized to purge another bed, while from the 3 kgmoles of $CO_2$ stream obtained at the feed end, 1.6 kgmoles is compressed to 2.2 MPa and used in step B of another bed and 1.4 mols are available as the 98.5% pure $CO_2$ product.

E. The bed is then purged at 0.12 MPa with hydrogen, obtained in step D from another bed, while the purge effluent exiting the feed end contains in kgmoles: 0.52 $CO_2$; 0.08 $CH_4$; 0.4 CO; and 0.4 $H_2$. This purge effluent may be utilized as fuel gas or for other purposes.

F. The bed is then repressurized with hydrogen in two stages, i.e., to 1.5 MPa with the hydrogen obtained in step C and finally repressurized to about 2.2 MPa with part of the hydrogen obtained in steps A and B.

In this example, 8 moles of feed gas were separated to 5.2 moles of 99.999% pure hydrogen, 1.4 moles of 98.5% pure $CO_2$ and 1.4 moles of fuel gas. In a cycle with 8 single beds, a feed rate of 320 kgmol/h can be treated. Without both steps B and D, the above separation would not be possible with a single PSA unit using only single beds.

EXAMPLE 2

A. Feed gas containing 66 mol % $H_2$, 30% CO, 3.7% $CO_2$ and 0.3% $H_2O$ is passed to the feed end of an activated carbon bed at 2 MPa. At the light product end, the adsorption effluent gas is 99.998% pure $H_2$.

B. The bed is then cocurrently depressurized to 0.8 MPa.

C. A gas containing 28 mol % $CO_2$, 0.8% $H_2O$, 70.5% CO, $H_2O$, and 0.7% $H_2$ is introduced to the feed end of the bed. The hydrogen obtained in steps B and C is utilized to repressurize other beds. At the end of step C, essentially all hydrogen is displaced from the portion of bed between the feed end and a side take-out located at about 70% of the bed height from the feed end. However, the last 30% of the bed still contains hydrogen, i.e., $CO—H_2$ front, and the last 8% of the bed contains 99.99% pure hydrogen. At the same time, the $CO_2$ front is only at about 18% of the bed height, i.e. close to the feed end.

D. The bed is then depressurized from 0.8 to 0.1 MPa by taking out gas simultaneously at 3 differnt points:

(1) 99.99% pure hydrogen is taken from the light product end to be used to purge another bed;

(2) 99% pure carbon monoxide is extracted at the side take-out, to be utilized as CO product;

(3) A gas containing 28% $CO_2$, and 70.5% CO is taken from the feed end to be utilized for rinsing, i.e., for $H_2$ displacement, of another bed.

During step D, two zero flow planes are established inside the bed, i.e., one is established at about 20% of the bed height from the feed end, and the other is established at about 70% of the bed height from the feed end. The portion of bed between 0 and 20% of the bed height depressurizes countercurrently, the portion between 20 and 70% depressurizes cocurrently to the side take-out, and the last part depressurizes towards the light product end. (See FIG. 5C.)

E. The bed is then purged with the 99.99% pure $H_2$ obtained from step D, and the purge effluent containing 25 Mole % $CO_2$, 1% $H_2O$, 38% CO and 36% $H_2$ is sent to fuel or utilized otherwise.

F. The bed is repressurized with hydrogen to 2 ; MPa.

In Example 2, the feed gas was separated into 3 streams:

(1) 92% of the hydrogen was recovered as 99.998% pure $H_2$;

(2) 81% of the carbon monoxide was recovered as 99% pure CO; and (3) the rest of $H_2$ and CO and essentially all of the $CO_2$ and water.

The same separation could have been obtained by splitting step D of Example 2 into the following two steps:

(D1) Depressurizing the bed cocurrently from 0.8 to 0.26 MPa and simultaneously extracting hydrogen at the light product end and carbon monoxide at the side take-out; and (D2) Further depressurizing the bed from 0.26 to 0.1 MPa while simultaneously taking out hydrogen at the top and a gas with 28% $CO_2$ and 70.5% CO at the feed end, i.e., DED.

Splitting step D into steps D1 and D2 can require one additional bed, but the CO product compressor and displacement gas compressor can be more easily designed and will work more smoothly.

The above separation can be efficiently carried out with a PSA unit comprising nine single beds:

| Bed Number | Step |
| --- | --- |
| 1 | Adsorption |
| 2 | Adsorption |
| 3 | Cocurrent depressurization equalization 1, 2 |
| 4 | Displacement |
| 5 | Double ended depressurization 1 |
| 6 | Double ended depressurization 2 |
| 7 | Purge |
| 8 | Equalization-repressurization 2 |
| 9 | Equalization 1 and final repressurization |

A somewhat less efficient but lower cost PSA unit can perform the same separation and can comprise six single beds:

| Bed Number | Step |
| --- | --- |
| 1 | Adsorption |
| 2 | Displacement and simultaneous cocurrent depressurization equalizations 1 and 2 |
| 3 | Triple ended depressurization |
| 4 | Purge |
| 5 | Equalization-repressurization 2 |
| 6 | Equalization 1 and final repressurization |

Ordinarily, mass transfer fronts can cause problems in single bed systems. For example, if the mass transfer front 124 is displaced from the bed 127, which causes the mass transfer front 124 depicted as curve in FIG. 2 to move to the right, the less adsorbable product becomes impure. This is because the adsorbent bed becomes saturated with the adsorbed material whereupon spillage of the adsorbed material into the relatively pure effluent product occurs. Impurities can also occur if the mass transfer front is left inside of the bed when countercurrent depressurization begins. An example of this includes the flow of material in the direction of arrow 129. The less adsorbable material 126 located at the product end of the bed 127 mixes with an adsorbable material 125 when flowing out the feed end of the bed 127.

Impurities are avoided when both the feed end of the bed 127 and the product end of the bed 127 are simultaneously depressurized. The adsorbent bed is said to undergo "double-ended depressurization" or "DED". Adsorbed material 125 flows in the direction of arrow 129 and the lesser adsorbed material flows in the direction of arrow 128. Thus, substantially pure adsorbed material is obtained from the feed end of the bed 127 and substantially pure less adsorbable material is obtained from the product end of the bed 127.

FIG. 2 is an example of a concentration profile at the beginning of double-ended depressurization. As double-ended depressurization starts, a zero flow plane 130 is established. To the left of the zero flow plane 130 material in the bed flows countercurrently or in the direction of arrow 129. To the right of zero flow plane 130 material flows cocurrently or in the direction of arrow 128. On both sides of the zero flow plane 130 the flow rate gradually increases and reaches a maximum at both ends of the bed.

The controlling of flow rates at both ends of the adsorbent bed are important because the relative flow rates at the adsorbent bed ends determine the position of the zero flow plane 130. The flow rates are different at both ends as the effluent at the feed end of the bed is more voluminous than the effluent at the product end during double-ended depressurization.

The reason for this differential unloading of the bed is twofold. Firstly, the portion of the bed charged with the more adsorbable component is larger. Secondly, more of the adsorbable material is bound at the same pressure to the bed than the lesser adsorbable material. Therefore, more adsorbable material is liberated than less adsorbable material as the pressure is lowered simultaneously from both ends.

Control of the relative flow rates at the ends can be done easily. For example, fixed position valves with critical flow can be positioned on a manifold formed by the lines 15 and 20 or on the individual inlets 11, 12, 13, and 14 or outlets 16, 17, 18 and 19. Alternatively, volumetric type compressors can be used in place of the fixed position valves. Double-ended depressurization is complete once the adsorbent bed has been depressurized to the desorption pressure level.

At the completion of the double-ended depressurization, the adsorbent bed is preferably purged. This is generally done by a countercurrent purge with a less adsorbable gas. The purge effluent can be used as fuel or can be compressed and then added back into the feed gas. The adsorbent bed is then ready for another adsorption cycle and can be repressurized without a purge step.

In cyclic operations, it is often difficult to control the flow rate of feed copurge gas and cycle time to have the concentration profile of the mass transfer front 124 of FIG. 2 in exactly the same place in each cycle. By increasing the feed and copurge flow rate or the time of adsorption, the mass transfer front 124 would gradually move cocurrently towards the product end of the adsorption bed. Conversely, reducing the feed and copurge flow rate or the time of adsorption causes the mass transfer front 124 to move countercurrently towards the feed end of the adsorption bed.

In accordance with the invention, it has been determined that to obtain a practically stable control over the position of the mass transfer front 124 within the adsorption bed, it is preferable to apply at least a small mass transfer front positioning and cocurrent depressurization step prior to double-ended depressurization to move the mass transfer front cocurrently towards the product end of the adsorption bed. When the front is too far towards the product end of the bed some gas can be extracted at a side take-out from the bed. This side take-out can be, for example, a commercially available bleeder valve.

The adsorbent bed can be a material that contains a member selected from the group consisting of zeolitic molecular sieves, activated carbon, silica gel, activated alumina, and mixtures or combinations thereof. Those skilled in the art recognize that virtually any selectively adsorbent material can be used in the process of the invention.

Gas mixtures suitable for separation typically have two or more components wherein one is more adsorbable than the other. It is often useful to think of the separable gas components as one being a "heavier" material and the other being a "lighter" material. Such characterizations of gaseous components can vary according to the type of adsorbent being used.

The invention can be useful for two-component gas mixtures as well as for more complicated gas mixtures. For instance, air can be separated by this invention into its various subcomponents by multi-cyclic processing. That is, multiple cycles can be performed until the pure subcomponents are separated. In the first cycle, a complex gas mixture is loaded onto the beds. A displacement gas comprising essentially the most adsorbable component of the mixture is then used to "copurge" the bed to move lesser adsorbable components up-stream. Then, upon double-ended depressurization, the more adsorbable components are separated from the feed end of the bed and the less adsorbable components are separated from the product end of the bed. Subsequent cycles can then be conducted to further separate the two products of the first cycle.

What I claim is:

1. A method for gas separation of adsorbable components from less adsorbable components on fixed adsorbent beds, comprising the steps of:
   (a) flowing a feed gas mixture under adsorption pressure to an adsorbent bed to selectively adsorb components from said feed gas onto the adsorbent bed, said bed having a feed end and a product end; and
   (b) displacing said feed gas with a gas having a higher concentration of adsorbable components, whereby less adsorbable components are displaced from a portion of the bed; and
   (c) depressurizing the bed by taking out gas simultaneously from at least two different locations of the bed to recover essentially pure less adsorbable components at the product end of the bed and to recover the adsorbable components from at least one of the different locations; and
   (d) pressurizing the bed.

2. The method of claim 1 wherein the step of depressurizing is simultaneously taking out gas from the feed end and the product end of the bed.

3. The method of claim 1 wherein the step of depressurizing is simultaneously taking out gas at a side take-out of the bed and at the product end of the bed.

4. The method of claim 1 where the step of depressurizing further comprises the steps of simultaneously taking out gas from the product end and the side takeout, and simultaneously taking out gas from the feed end and the product end.

5. The method of claim 1 wherein the step of depressurizing is taking out gas simultaneously from the feed end, product end and a side take-out.

6. The method of claim 1 further comprising the step of purging the bed with the less adsorbable components prior to the step of repressurizing.

7. The method of claim 6 wherein said step of purging is carried out with a purge gas obtained from the product end during said step of depressurizing.

8. The method of claim 1 wherein said steps of flowing and displacing are carried out at essentially the same pressure.

9. The method of claim 1 further comprising the step of depressurizing the bed from a side takeout prior to said step of depressurizing the bed by taking out gas simultaneously.

10. The method of claim 1 further comprising the step of depressurizing said bed in a cocurrent direction, said cocurrent depressurization occurring prior to said step of simultaneously depressurizing.

11. The method of claim 10 wherein said cocurrent depressurization step is performed before said step of displacing.

12. The method of claim 11 where the step of cocurrent depressurizing further comprises the step of repressurizing other beds with a gas obtained from the product end.

13. The method of claim 10 wherein said step of cocurrent depressurization is performed simultaneously with said step of displacing.

14. The method of claim 10 wherein said step of cocurrent depressurization is performed after said step of displacing.

15. The method of claim 10 where the step of cocurrent depressurizing further comprises repressurizing other beds with a gas obtained from the product end.

16. The method of claim 10 wherein the step of cocurrent depressurization is continued to a sufficiently low pressure to position a mass transfer front within said bed for maximum separating efficiency in said step of simultaneously depressurizing.

17. The method of claim 10 wherein the step of displacing further comprises the step of flowing said first component recovered from the feed end onto said bed.

18. The method of claim 17 wherein said first component comprises carbon monoxide, carbon dioxide, or methane and wherein said second component comprises hydrogen or nitrogen.

19. The method of claim 18 wherein said adsorbent bed is a material that contains a member selected from the group consisting of zeolitic molecular sieves, activated carbon, silica gel, activated alumina, and mixtures thereof.

20. The method of claim 1 wherein said step of displacing is performed using fixed position valves.

21. The method of claim 1 wherein said step of displacing is performed using volumetric compressors.

22. The method of claim 1 wherein the number of adsorbent beds is at least four.

23. The method of claim 1 wherein the number of adsorbent beds is five.

24. The method of claim 1 wherein the number of adsorbent beds is six.

25. The method of claim 24 wherein the step of selectively adsorbing components occurs in at least one bed at any given time.

26. A method for gas purification, comprising the steps of:
(a) flowing a feed gas mixture current under pressure through a fixed adsorbent bed, said mixture flowing firstly through a feed end, secondly through said bed, and thirdly out through a product end, said mixture comprising at least two components wherein a first component is more adsorbable than a second component, said first component being selectively adsorbed onto said bed; and
(b) displacing said mixture with a gas having a higher concentration of said first component, whereby said second component is displaced from said feed end; and
(c) depressurizing both of said ends simultaneously by lowering said pressure, whereby said first component is recovered from said feed end in a substantially pure state and said second component is recovered from said product end in a substantially pure state.

27. The method of claim 26 further comprising the step of cocurrently depressurizing said bed to position a mass transfer front within said bed, said cocurrent depressurization step occuring prior to said simultaneous depressurizing step.

28. The method of claim 27 wherein said cocurrent depressurization step is prior to said step of displacing.

29. The method of claim 27 wherein said cocurrent depressurization step is performed subsequent to said step of displacing.

30. The method of claim 27 where said step of cocurrent depressurization further comprises the step of lowering said pressure at said product end.

31. The method of claim 27 where said step of cocurrent depressurization further comprises the step of lowering said pressure at a side take-out located on said bed.

32. The method of claim 31 where said step of displacing further comprises the step of flowing said first component recovered from said feed end into said bed.

33. The method of claim 32 further comprising the step of pressurizing said bed subsequent to the step of simultaneous depressurization.

34. The method of claim 33 wherein said first component comprises carbon monoxide, oxygen, or methane and wherein said second component comprises hydrogen or nitrogen.

35. The method of claim 34 wherein said adsorbent bed is a material that contains a member selected from the group consisting of zeolitic molecular sieves, activated carbon, silica gel, activated alumina, and mixtures thereof.

36. The method of claim 26 wherein said cocurrent depressurization step is performed simultaneously with said step of displacing.

* * * * *